United States Patent Office

3,784,491
Patented Jan. 8, 1974

3,784,491
POLYMERIZATION OF VINYL MONOMERS USING COACERVATE STABILIZING AGENTS CONTAINING GELATIN
Roman L. Pozorski, South Holland, Ill., assignor to Wilson & Co., Inc., Oklahoma City, Okla.
No Drawing. Continuation-in-part of abandoned application Ser. No. 792,153, Jan. 17, 1969. This application May 27, 1971, Ser. No. 147,676
Int. Cl. C08f 45/60
U.S. Cl. 260—8
10 Claims

ABSTRACT OF THE DISCLOSURE

Significant improvements in the process and product are achieved using a dispersion polymerization method comprising polymerizing a vinyl monomer in an aqueous medium together with a coacervate of a water-soluble positively-charged, proteinaceous colloid and at least one negatively-charged, water-soluble colloid as a stabilizing agent.

INTRODUCTION

This application is a continuation-in-part of Ser. No. 792,153, filed Jan. 17, 1969, and now abandoned.

This invention relates to the use of coacervates as stabilizing agents in dispersion polymerizations and more particularly to the stabilization of dispersed vinyl monomer droplets in suspension or in emulsion polymerization using as a stabilizing agent a coacervate of a water-soluble, positively-charged, proteinaceous colloid and at least one negatively-charged, water-soluble colloid. The term dispersion polymerization is used herein to refer to both suspension and emulsion polymerizations.

BACKGROUND OF THE INVENTION

Suspension and emulsion polymerizations are the most widely used processes for making polymers, both in terms of the number of different polymers and of the number of tons produced by the processes. Practically all of the common polymers, including some of the newer polymers such as polyvinyl chloride, polyethylene, polypropylene, polyvinyl acetate, polymethyl methacrylate, may be made by these methods.

In suspension polymerization, droplets of liquid monomer are dispersed in water and polymerized in the presence of a polymerization initiator, advantageously heat and/or a catalyst, into solid particles. The procedures used in suspension polymerization involve the dispersion of the monomer into an agitated medium usually comprising water and containing small amounts of suspending and dispersing agents. In order for the monomer to be dispersed, it must be immiscible or fairly insoluble in the reaction medium. The catalyst, if used as the initiator, is dissolved in the monomer or, when a gaseous monomer is used, is included in the reaction medium. Polymerization of volatile monomers is normally made under pressure in order to maintain the monomer in the liquid form. After completion of the polymerization, any remaining monomer is removed, as by evaporation, from the polymer particles, and the product is filtered, washed, and dried. The dried product is then packaged for sale in powder form or may be extruded into pellet form.

The advantages of suspension polymerization are numerous. Attributable in large part to the fact that the suspension medium consists mainly of water, suspension polymerization is one of the most economical methods of polymerization. The removal of excessive heat of polymerization presents little problem as water is an excellent heat transfer medium; for the same reason, control of temperature is relatively simple. Another advantage is the high quality and purity of the polymer product obtainable, since only minimal amounts of various agents such as catalyst, suspending agents, and dispersing agents are normally employed in the polymerization process, and most of these amounts are removed in the subsequent purification steps.

In emulsion polymerization a liquid monomer is emulsified in water by the use of a surfactant (surface-active) agent) or emulsifier. The surfactant micelles provide the polymerization centers. Free radical initiators supplied either by a water-soluble initiator or by growing chains of low molecular weight normally diffuse into the micelle, where reaction occurs to form a relatively linear polymer of high molecular weight. The small size of the particles (submicron diameter) and the action of the surfactant cause the particles to remain in stable suspension. The rate of emulsion polymerization and the molecular weight of the polymer increase with increasing fineness of the emulsion. The reaction product, a stable colloidal suspension of the polymer in water, usually is called a polymer latex or polymer emulsion. Polymer latexes are used directly for the vehicles of water-based paints, for adhesives, and for treating textiles. The polymer can be coagulated and separated from the aqueous medium, however, by the addition of polar solvents or electrolytes to the colloidal suspension. Since it is frequently necessary to use moderately high concentrations of surfactants and stabilizers, emulsion polymers are generally less pure than those produced by suspension polymerization.

The chief problem in suspension or emulsion polymerization is in the formation and maintenance of a uniform suspension of the monomer droplets as they are slowly transformed from a highly mobile, immiscible liquid, through a viscous, sticky consistency, and finally to small, solid particles without coalescence or agglomeration of the particles into a conglomerate mass. Ideally, the initial monomer droplet should remain the same size throughout the polymerization reaction. The factor which is generally considered by resin producers to be most essential for maintenance of this uniform size is the suspending agent or stabilizer. Although used in relatively small amounts, the stabilizer is the key to successful control of the process and the uniformity of the product obtained. Stabilizers prevent the coalescence of suspended droplets of the monomer while they undergo physical changes from mobile, liquid particles to fine solid, polymeric particles. The effectiveness of a stabilizer is significantly dependent upon its ability to surround or coat a given, minute particle in suspension and prevent it from coalescing with nearby particles during the polymerization reaction. Initial, uniform dispersion of the monomer into fine droplets by the use of a proper amount and types of dispersing agent coupled with agitation to maintain the dispersion and, finally, stabilization of the dispersed droplets with a highly effective stabilizer are the major prerequisites for obtaining a uniform polymer product with particles of the desired size and physical characteristics.

Most of the common stabilizers function mainly by surrounding each droplet with a coating or protective film which prevents the particles from sticking together during agitation. Otherwise, the particles tend to agglomerate into clusters, and even to coalesce into larger irregular shapes, instead of remaining as small bead- or shot-like particles. While a great variety of commercial suspension and emulsion systems are presently in use, none of them has been found completely satisfactory for preventing agglomeration and forming uniform polymer particles.

OBJECTS OF THE INVENTION

Accordingly, it is a primary object of the present invention to provide an improved method of stabilizing vinyl monomer dispersions using coacervates as the stabilizing agent.

A further object of the invention is to provide an improved method of stabilizing suspensions and emulsions of vinyl monomers during polymerization using coacervates as the stabilizing agents.

Another object of the invention is to provide an improved method of stabilizing dispersions of vinyl monomers in suspension and emulsion polymerization to promote the uniform formation of polymer particles and prevent agglomeration using coacervates as the stabilizing agent.

A further object of the present invention is to provide an improved method of stabilizing dispersions of vinyl monomers using coacervates as the stabilizing agent where by varying the coacervate concentration, the particle size of the final polymer can be controlled.

SUMMARY OF THE INVENTION

This invention provides a highly effective stabilizing agent for the polymerization of vinyl monomers. The stabilizing agent is a coacervate formed in aqueous medium by the interaction or coacervation of a water-soluble, positively-charged, proteinaceous colloid and at least one negatively-charged, water-soluble colloid. Normally, the coacervate is present in the polymerization medium in amounts of from about 0.01 to 20 or more parts, preferably 0.1 to 10 parts, per 100 parts of vinyl monomer.

Coacervation, in its broadest sense, is the phenomenon of phase separation in polymer solutions with the concomitant formation of two or more liquid phases. Common to all coacervation procedures is the formation of at least one liquid, polymer-rich phase. The terminology coacervation was introduced by Krupt and Bungenberg de-Jong, Kolloid Z, 50, 39 (1930) to distinguish this formation of at least one liquid, polymer-rich phase from the precipitation of a polymer solute in solid form. The coacervate itself is the polymer solute which separates in the form of liquid droplets. The polymer solute may be phased out of solution as the liquid coacervate by many system changes including temperature, concentration and pH adjustment or by addition of salts, solvent or another polymer. Exemplary of the numerous descriptions of various aspects of such polymer phase separation processes are the following literature articles: A. Dobry and F. Boyer-Kawenoki, J. Polymer Sci., 2, 90 (1947); R. L. Scott, J. Chem. Phys., 17, 268–279 (1949); and C. H. Bamford and H. Tampa, Trans. Faraday Soc., 46, 310–316 (1949).

BASIC PARAMETERS OF THE INVENTION

The coacervates.—The coacervates useful in the present invention as polymerization stabilizers or suspension agents are various-sized liquid droplets formed in the coacervation in an aqueous solution of a water-soluble, positively-charged proteinaceous colloid such as gelatin, albumin, keratin, collagen, gluten or casein and at least one negatively-charged, water-soluble colloid. The terms "positively-charged" and "negatively-charged" refer to the character of the colloids in an aqueous medium under the coacervation conditions. Thus, "positively-charged" and "negatively-charged" mean that under the coacervation conditions the proteinaceous colloid is cationic and the counterpart colloid is anionic. The positively-charged, water-soluble proteinaceous colloid forms coacervates with negatively-charged, water-soluble colloids in aqueous solutions. For example, within an appropriate pH range, Type A gelatin, the cationic form of gelatin normally derived from pigskins by acid treatment, combines with Type B gelatin, the anionic form of gelatin normally derived from bone or calfskin by decalcification with acid followed by treatment with a lime slurry and hot water extraction, or anionic gums to form stable, macromolecular coacervates. The term "gum" refers to polysaccharides and their derivatives, both the natural types derived from vegetable or plant matter, and synthetic types, both of which are dispersible in water to produce viscous, colloidal solutions. The gums should be water-soluble to the extent of at least about 0.1% by weight.

The coacervate may surround and trap the immiscible droplets of a liquid vinyl monomer in dispersion and thus prevent their coalescence during polymerization. Furthermore, since the coacervates are generally of uniform size, each polymer particle would generally be of uniform size. It should be made clear, however, that the coacervate need not be prepared after dispersion of the vinyl monomer. The essential feature of this invention is that the polymerization be effected in the presence of the coacervate.

The water-soluble, positively-charged proteinaceous colloid of the coacervate useful in the invention is preferably Type A or Type B gelatin. The negatively-charged, water-soluble colloid is preferably Type B gelatin or one or more water-soluble gums capable of forming a negatively-charged colloid. The colloids should be water-soluble to the extent of at least 0.1% by weight, and preferably at least 0.5%. Particularly advantageous coacervates are formed from an aqueous colloidal solution of Type A gelatin with Type B gelatin, natural polysaccharide gums such as gum arabic, gum tragacanth, gum karaya, agar agar, ghatti gum, guar, locust bean gum, larch gum, algin quince seed gum or synthetic polysaccharide gums such as carboxymethylcellulose, methylcellulose, hydroxypropylcellulose, ethylhydroxycellulose, hydroxyethylcellulose, hydroxypropylmethylcellulose, carboxymethyl starch, hydroxyethyl starch or dextran. The preferred coacervates may also be formed from an aqueous colloidal solution of Type B gelatin in combination with the natural gums or synthetic gums. In a preferred specific embodiment, the coacervate is formed from Type A gelatin and gum arabic.

Process techniques.—It has been determined that in a preferred method of this invention a very stable suspension or emulsion of a liquid vinyl monomer is obtained by establishing the desired vinyl monomer particle-size in solution with the colloids at a pH outside the coacervation range of the colloids. After the vinyl monomer droplets have been thoroughly dispersed by agitation and normally also with the aid of a surfactant, the pH is lowered with the coacervation range of the colloids in order to form the coacervate. The step of lowering the pH not only causes the coacervate to form but has the further benefit of bringing the pH within the optimum range for polymerization. However, when polymerizing vinyl monomers which are gaseous at atmospheric conditions, such as vinyl chloride, the coacervate may be formed prior to the vinyl monomer addition; the gaseous vinyl monomer particles may then disperse themselves within the coacervate. Thereafter, pressure is normally applied prior to the polymerization.

In accordance with another preferred method of the invention, polymerization is accomplished by first establishing a stable suspension of a vinyl monomer in water together with at least one of the colloids, thereafter forming the coacervate of the proteinaceous colloid and negatively-charged colloid by addition of the negatively-charged colloid, and finally effecting polymerization in the presence of a polymerization initiator, advantageously heat and/or a catalyst.

In accordance with another preferred technique, the proteinaceous colloid and the negatively-charged colloidal component are each dissolved separately in water, and the pH of each solution adjusted to a value in excess of the coacervation range of the colloids. The aqueous solutions are then combined and the monomer dispersed therein. The pH of the suspension is then reduced by addition of an acid to provide a pH value within the coacervation range of the colloids.

Alternatively, rather than raising the pH of each solution, the monomer is dispersed in one of the solutions.

Then when the two solutions are combined, the coacervate forms, with or without pH adjustment.

In accordance with another technique, the colloids are dissolved in water. Upon mixture the pH of the resultant colloidal solution is such that the coacervate forms; thus pH change is not required to form the coacervate as by this technique mere mixture of the colloids forms the coacervate. The pH of the solution may then be raised to dissolve the coacervate and to permit dispersion of the vinyl monomer. Thereafter the coacervate is re-formed by lowering the pH. Alternatively, the vinyl monomer is dispersed after the coacervate formation without dissolving the coacervate.

Since the coacervate forms at dilute concentrations of colloid material, normally from about 0.001% to about 5.5% and sometimes even about 10% colloidal material by weight based upon the water content, a further technique is to disperse the monomer in a solution of proteinaceous colloid and the negatively-charged colloid in which the concentration of the colloids is greater than that at which coacervation occurs. The coacervate is then formed by adding water to the mixture to reduce the colloid concentration, normally until the colloid concentration is reduced below about 5.5% by weight and preferably below 3% by weight.

In accordance with one specific aspect of the invention a vinyl monomer advantageously containing a polymerization catalyst is dispersed in a dilute solution of gelatin and the negatively-charged colloidal component. The dispersion may also include a small amount of surfactant or emulsifier. The pH of the aqueous solution is then adjusted with an acid in order to form the coacervate. Polymerization is then carried out in the conventional manner. Fine, uniform, spherical particles are produced without agglomerates.

One of ordinary skill in the art can make various modifications of these various techniques to adapt the method of the invention to particular apparatus and processing requirements. It is apparent, however, that, in its broadest concept, this invention contemplates the stabilization of a vinyl monomer for suspension or emulsion polymerization procedures with a coacervate of a positively-charged, water-soluble proteinaceous colloid and at least one negatively-charged water-soluble colloid. Preferred methods contemplate forming the coacervate after dispersing the vinyl monomer. However, the coacervate might also be added or produced after dispersion of the monomer, even after the dispersion of a liquid monomer.

In the process of this invention, vinyl monomers which are water-immiscible in the liquid state may be polymerized in combination with a polymerization initiator, advantageously heat and/or catalyst. Suitable catalysts are organic peroxide catalysts such as benzoyl peroxide, cumyl peroxide, lauroyl peroxide, dicumene peroxide, and t-butyl hydroperoxide, azo catalysts such as $\alpha,\alpha$-azodiisobutyronitrile and redox catalysts. Also ultraviolet light may be useful as the polymerization initiator. Moreover, some vinyl monomers are somewhat autopolymerizable under severe conditions of heat and/or pressure. The initiator is included as polymerization cannot be effectively carried out in its absence.

The vinyl monomers may conventionally also include colorants, antioxidants, plasticizers, and other ingredients to modify the properties of the finished product.

*The monomers.*—The polymerization process of this invention is applicable to vinyl monomers and mixtures thereof with other monomers which are water immiscible in the liquid state. Vinyl monomers are defined as those monomers having a terminal, carbon to carbon double bond of the type $>C=CH_2$. Particularly monomers of less than about 15 carbon atoms are useful. Exemplary of useful vinyl monomers are vinyl esters of carboxylic acids such as vinyl acetate, vinyl propionate, vinyl butyrate, and vinyl benzoate; unsaturated acids such as acrylic acid and methacrylic acid; esters of unsaturated acids such as methyl acrylate, methyl methacrylate, ethyl acrylate, butyl acrylate, and allyl acrylate; vinyl aromatic compounds such as styrene, chlorostyrenes, alkyl-substituted styrenes, divinyl benzenes and vinyl naphthalenes; dienes such as butadiene, chloroprene, isoprene; acrylic acid amides such as acrylic acid amide and methacrylic acid amide; ethylenically unsaturated nitriles such as acrylonitrile and methacrylonitrile; $\alpha$-olefins such as ethylene, propylene, butylene and octylene; and vinyl halides such as vinyl chloride, vinyl bromide and vinylidene chloride. Particularly advantageous monomers are vinyl chloride, vinyl acetate, vinyl chloride-vinyl acetate mixtures, vinyl chloride-ethylene or propylene mixtures, styrene, and methyl methacrylate.

*Preferred gelatin coacervates.*—The invention will be described hereinafter in terms of gelatin as the positively-charged, water-soluble proteinaceous colloid. Solutions of gelatin and the negatively-charged, water-soluble colloidal component are normally formed by dissolving less than 5.5% by weight, and preferably less than 3% by weight of colloid in water. The pH of each colloidal solution may then be raised to about pH 9 by the addition of a dilute base such as sodium or ammonium hydroxide. The colloids are preferably then combined in about equal proportions, although the ratio of gelatin to the more negative component may normally range from 0.5:1 to 2:1.

The gel strength of the gelatin is a factor to be taken into consideration with respect to the efficiency of the coacervate as a stabilizer. The greater the gel-strength value of the gelatin, the larger the volume of the coacervate will be. Consequently, gelatin of a high gel strength within the range of 200–300 Bloom-grams is preferred.

In suspension polymerization of this invention a small amount (i.e., substantially less than 1% by weight) of surfactant or emulsifier such as Dupanol EM, a product sold by Du Pont and substantially comprising a sodium salt of lauryl sulfuric acid (commonly misnamed sodium lauryl sulfonate), or Triton–200, a polyglycol surfactant marketed by the Rohm & Haas Corporation, is present in the colloidal solution. The vinyl monomer is dispersed in this aqueous solution with constant agitation or stirring, and the pH is reduced to a value within the coacervation range by the addition of a dilute acid such as hydrochloric or sulfuric to form the coacervate. More specifically, when Type A gelatin is used with gum arabic, tragacanth, karaya or agar agar, the pH is normally reduced to the range of 3.2–5.0. When type B gelatin is used with gum arabic, tragacanth, karaya or agar agar, the pH is normally reduced to the range of 2.5–4.4. When Type A gelatin and Type B gelatin are used in combination, a pH of about 5.3–6.5 is normally required. Thereafter polymerization is effected.

Polymer particles prepared by these suspension polymerizations using the gelatin-gum or gelatin-gelatin stabilizer of the invention are exceptionally uniform in size compared to particles formed by the same process using polyvinyl alcohol, a commercially used stabilizer. While the initial size of the monomer particle is primarily determined by the amount and quality of the suspending and dispersing agents and the degree of agitation, the uniformity of particle size depends upon the extent the particles are prevented from agglomerating. In present-day suspension polymerization systems using polyvinyl alcohol, polymer particles vary in diameter over a range of 100 microns or more. Polymer particles can be produced in accordance with the present invention within a range of diametral variance of only 20 microns.

Additionally, the concentration of coacervate bears a direct relationship to the average particle size of the polymers formed by suspension polymerization. More particularly, as the concentration of coacervate increases the average particle size decreases in direct proportion. The following data obtained from the polymerization of vinyl chloride in the presence of Type A gelatin-gum arabic coacervate clearly demonstrates this relationship:

| Concentration of coacervate, parts per 100 parts of monomer: | Average particle size of polyvinylchloride |
|---|---|
| 0.20 | 130 |
| 0.15 | 170 |
| 0.10 | 185 |
| 0.05 | 220 |

Experiments indicate that average particle size varying between about 1000 microns to 25 microns can be achieved. When using vinyl chloride, the average particle size of the polymer is normally between about 250 and 25 microns. Also, in a polymerization of methyl methacrylate where 1 part of coacervate per 100 parts of monomer was present, 90 to 95% of the particles had a diameter of 75 microns or smaller.

In emulsion polymerization of this invention, a vinyl monomer is dispersed in a solution of gelatin and a negatively-charged colloidal component also including a catalyst and sufficient emulsifier to form the emulsion wherein the dispersed phase comprises droplets of monomers and the bulk phase is water containing emulsifier, stabilizer, and advantageously initiator. The pH of the aqueous solution is then adjusted with acid to form the coacervate. Polymerization is then effected. A thick, stable polymer latex or emulsion free of agglomerates is produced.

More specifically, in the emulsion polymerization of this invention any water-immiscible vinyl monomer may be employed in combination with a water-soluble catalyst such as ammonium persulfate. As in the case of suspension polymerization, the aqueous solution of a gelatin and a more negative colloidal component are formed by dissolving normally less than 5.5% by weight, preferably less than 3% by weight, of colloid in water. The pH of each solution is raised to about 9 by the addition of a dilute base. The colloids are preferably then combined in equal proportions, although the ratio of gelatin to the more negatively-charged colloid component may normally range from 0.5:1 to 2:1. The same considerations with respect to gel strength relevant to suspension polymerization are applicable to emulsion polymerization. Emulsifier and catalyst are added. The pH of the monomer-emulsion is then reduced to the coacervation range by the addition of a dilute acid. Polymerization is then effected.

EXAMPLES

The following examples, in which all parts are by weight, are illustrative of the use of coacervates as stabilizing agents in the polymerization of vinyl monomers according to this invention.

Example I

In 100 parts of deionized water each were separately dissolved 0.2 part of Type A gelatin and 0.2 part of gum arabic. The pH of each colloidal solution was adjusted to between 9 and 10 by the addition of a small amount of dilute sodium hydroxide. The gelatin and gum arabic solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform spherical particles were produced, and there was no formation of agglomerates. The product was drained through a sieve, washed with warm water, and air-dried.

Example II

In 100 parts of deionized water each were separately dissolved 0.15 part Type A gelatin and 0.15 part of gum arabic. The pH of each colloidal solution was adjusted to between 9 and 10 by the addition of a small amount of dilute sodium hydroxide. The gelatin and gum arabic solutions were then combined with 150 parts of water containing 0.06 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 5 by adding dilute hydrochloric acid, thereby forming the gelatin-gum arabic coacervate and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were produced without formation of agglomerates. The product was drained through a sieve, washed with warm water, and air-dried.

Example III

In 100 parts of water each were separately dissolved 0.20 part Type A gelatin and 0.10 part of gum arabic. The pH of each colloidal solution was adjusted to between 9 and 10 by the addition of a small amount of dilute sodium hydroxide. The gelatin and gum arabic solutions were then combined with 150 parts of water containing 0.06 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 5 by adding dilute hydrochloric acid, thereby forming the gelatin-gum arabic coacervate and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were produced, and there was no formation of agglomerates. The product was drained through a sieve, washed with warm water, and air-dried.

Example IV

In 200 parts cold water were dissolved 2 parts of Type A gelatin and 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. To stabilize the dispersion of the monomer, two parts of gum arabic dissolved in twenty parts of water were added to the mixture, whereby a gelatin-gum arabic coacervate was formed. Polymerization was initiated by bringing the temperature of the reaction medium to 140–176° F. (60–80° C.). This temperature and agitation were maintained for 2½ hours to complete polymerization. Fine, uniform, spherical particles were produced, and there was no formation of agglomerates. The product was drained through a sieve, washed with warm water, and air dried.

Example V

In 100 parts of water each were separately dissolved 0.20 part Type A gelatin and 0.20 part of gum tragacanth. The pH of each colloidal solution was adjusted to between 9 and 10 by the addition of a small amount of dilute sodium hydroxide. The gelatin and gum tragacanth solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 5 by adding dilute hydrochloric acid while stirring, thereby forming the gelatin-gum tragacanth coacervate and producing a stable dispersion of the monomer. Polymerization was initiated by bringing the temperature of the reaction medium to 140–176° F. (60–80° C.). This temperature and agitation were maintained with agitation for 2½ hours to complete polymerization. Fine, uniform, spherical particles were produced without formation of agglomerates. The product was drained through a sieve, washed with warm water, and air-dried.

Example VI

In the procedure described in Example V, 0.20 part gum karaya was substituted for the gum tragacanth, producing the same results.

Example VII

In the procedure described in Example V, 0.20 part agar agar was substituted for the gum tragacanth, producing the same results.

Example VIII

In 100 parts of water each were separately dissolved 0.20 part type A gelatin and 0.20 part of Type B gelatin. The pH of each colloidal solution was adjusted to between 9 and 10 by the addition of a small amount of dilute sodium hydroxide. The Type A gelatin and Type B gelatin solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 6 by adding dilute hydrochloric acid while stirring, thereby forming the gelatin coacervate and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were produced, and there was no formation of agglomerates. The product was drained through a sieve, washed with warm water and air-dried.

Example IX

In 100 parts of water each were separately dissolved 0.20 part Type B gelatin and 0.20 part of gum arabic. The pH of each colloidal solution was adjusted to between 9 and 10 by the addition of a small amount of dilute sodium hydroxide. The gelatin and gum arabic solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 4 by adding dilute hydrochloric acid while stirring, thereby forming the gelatin-gum arabic coacervate and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were produced without formation of agglomerates. The product was drained through a sieve, washed with warm water and air-dried.

Example X

In the procedure described in Example IX, 0.20 part gum tragacanth was substituted for the gum arabic, producing the same result.

Example XI

In the procedure described in Example IX, 0.20 part gum karaya was substituted for the gum arabic, producing the same results.

Example XII

In the procedure described in Example IX, 0.20 part agar agar was substituted for the gum arabic, producing the same results.

Example XIII

In 100 parts of deionized water was dissolved 0.20 part Type A gelatin. In another 100 parts of deionized water were dissolved 0.18 part gum arabic and 0.02 part sodium carboxymethylcellulose (CMC). The pH of each colloidal solution was adjusted to between 9 and 10 by the addition of a small amount of dilute sodium hydroxide. The gelatin and gum arabic-CMC solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 5 by adding dilute hydrochloric acid while stirring, thereby forming the gelatin-gum arabic and gelatin-CMC coacervates and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were prouced without formation of agglomerates. The product was drained through a sieve, washed with warm water and air-dried.

Example XIV

In 100 parts of deionized water was dissolved 0.20 part Type A gelatin. In another 100 parts of deionized water were dissolved 0.18 part gum tragacanth and 0.02 part sodium carboxymethylcellulose (CMC). The pH of each colloidal solution was adjusted to between 9 and 10 by the addition of a small amount of dilute sodium hydroxide. The gelatin and gum tragacanth-CMC solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 4 by adding dilute hydrochloric acid while stirring, thereby forming the gelatin-gum tragacanth and gelatin-CMC coacervates and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were produced, and there was no formation of agglomerates. The product was drained through a sieve, washed with warm water and air-dried.

Example XV

In 100 parts of deionized water was dissolved 0.20 part Type A gelatin. In another 100 parts of deionized water were dissolved 0.18 part gum karaya and 0.02 part sodium carboxylmethylcellulose (CMC). The pH of each colloidal solution was adjusted to between 9 and 10 by the addition of a small amount of dilute sodium hydroxide. The gelatin and gum karaya CMC solutions were then combined with 150 parts of water containing 0.09 part Dupanol EM. In 100 parts methyl methacrylate monomer was dissolved 0.50 part of benzoyl peroxide. To disperse the catalyst-containing monomer in the colloidal mixture, the monomer was added to the mixture slowly and with continuous agitation. The pH of the mixture was then adjusted to about 4 by adding dilute hydrochloric acid while stirring, thereby forming a gelatin-gum karaya and gelatin-CMC coacervates and producing a stable dispersion of the monomer. Polymerization was initiated by bringing the temperature of the reaction medium to 140–176° F. (60–80° C.). This temperature and agitation were maintained for 2½ hours to complete polymerization. Fine, uniform, spherical particles were produced, with no formation of agglomerates. The product was drained through a sieve, washed with warm water and air-dried.

Example XVI

In 80 parts water were dissolved 1.2 parts of Type A gelatin and 1.2 parts of gum arabic. The pH of this colloidal solution was made alkaline by the addition of 10 parts of 0.1 N NaOH, 0.4 part Dupanol EM emulsifier was added, and agitation of the solution was begun. A monomer mixture containing 40 parts methyl methacrylate and 40 parts ethyl acrylate was slowly added to form a dispersion of the monomer. The pH of the emulsion was thereafter reduced to about 5 by the addition of 10 parts 0.1 N HCl. To initiate polymerization, 20 parts of the emulsion were transferred to a polymerization vessel containing 20 parts of water and 0.16 part catalyst. The reaction mixture was then warmed to 180–185° F. (about 85° C.) to begin polymerization. Thereupon the remainder of the monomer emulsion was slowly added as the temperature was raised to 200° F. (94° C.), where it was maintained for two hours to substantially complete polymerization. A stable emulsion of polymer particles was produced.

Example XVII

In 30 parts water were dissolved 1.5 parts of Type A gelatin and 1.5 parts of gum arabic. One part Dupanol EM emulsifier was added and agitation of the solution begun. Eighty parts of methyl methacrylate monomer were slowly added to form a dispersion of the monomer. Seventy parts of water were added to the emulsion to form the gelatin-gum arabic coacervate by dilution. Polymerization was initiated by adding 0.2 part catalyst to 20 parts of the stabilized monomer emulsion and raising the temperature to 180–190° F. (85° C.). The remainder of the monomer was slowly added thereafter. A reaction time of about two hours produced a thick, stable polymer emulsion.

Example XVIII

One part of Type A gelatin and one part of gum arabic were dissolved in 80 parts water. The pH of this colloidal solution was made alkaline by the addition of 10 parts of 0.1 N NaOH, 2.0 parts Triton-200 were added, and agitation of the solution was begun. Eighty parts of methyl methacrylate monomer were slowly added to form a dispersion of the monomer. The pH of the emulsion was thereafter reduced to a value about pH 5 by the addition of 10 parts 0.1 N HCl. To initiate polymerization, 0.2 part catalyst was added to 20 parts of the monomer emulsion and the temperature raised to 180–190° F. (85° C.). The remainder of the monomer was slowly added thereafter. A reaction time of about two hours produced a thick, stable polymer emulsion.

Example XIX

In the procedure described in Example XVIII, one part of gum tragacanth was substituted for the gum arabic, producing the same result.

Example XX

In the procedure described in Example XVIII, one part of gum karaya was substituted for the gum arabic, producing the same results.

Example XXI

In the procedure described in Example XVIII, one part agar agar was substituted for the gum arabic, producing the same results.

Example XXII

One part of Type A gelatin and one part of Type B gelatin were dissolved in 80 parts water. The pH of this colloidal solution was made alkaline by the addition of 10 parts of 0.1 N NaOH, 2.0 parts Triton-200 were added, and agitation of the solution was begun. Eighty parts of methyl methacrylate monomer were slowly added to form a dispersion of the monomer. The pH of the emulsion was thereafter reduced to a value about pH 6 by the addition of dilute hydrochloric acid. To initiate polymerization, 0.2 part catalyst was added to 20 parts of the monomer emulsion and the temperature raised to 180–190° F. (85° C.). The remainder of the monomer was slowly added thereafter. A reaction time of about two hours produced a thick, stable polymer emulsion.

Example XXIII

One part of Type B gelatin and one part of gum arabic were dissolved in 80 parts water. The pH of this colloidal solution was made alkaline by the addition of 10 parts of 0.1 N NaOH, 2.0 parts Triton-200 were added, and agitation of the solution was begun. Eighty parts of methyl methacrylate monomer were slowly added to form a dispersion of the monomer. The pH of the emulsion was thereafter reduced to a value about pH 4 by the addition of dilute hydrochloric acid. To initiate polymerization, 0.2 part catalyst was added to 20 parts of the monomer emulsion and the temperature raised to 180–190° F. (85° C.). The remainder of the monomer was slowly added thereafter. A reaction time of about two hours produced a thick, stable polymer emulsion.

Example XXIV

In the procedure described in Example XXIII, one part of gum tragacanth was substituted for gum arabic, producing the same results.

Example XXV

In the procedure described in Example XXIII, one part of gum karaya was substituted for the gum arabic, producing the same results.

Example XXVI

In the procedure described in Example XXIII, one part of agar agar was substituted for the gum arabic, producing the same results.

Example XXVII

In 100 parts of deionized water each were dissolved 0.20 part Type A gelatin and 0.20 part of gum arabic. The pH of each colloidal solution was adjusted to between 9 and 10 by the addition of a small amount of dilute sodium hydroxide. The colloidal solution was then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXVIII

In 100 parts of deionized water each were dissolved 0.20 part Type A gelatin and 0.20 part of gum tragacanth. The pH of each colloidal solution was adjusted to between 9 and 10 by the addition of a small amount of dilute sodium hydroxide. The colloidal solution was then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXIX

In 100 parts of deionized water each were dissolved 0.20 part Type A gelatin and 0.20 part of gum karaya. The pH of each colloidal solution was adjusted to between 9 and 10 by the addition of a small amount of dilute sodium hydroxide. The colloidal solutions were then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXX

In 100 parts of deionized water each were dissolved 0.20 Type A gelatin and 0.20 part of agar agar. The pH of each colloidal solution was adjusted to between 9 and 10 by the addition of a small amount of dilute sodium hydroxide. The colloidal solutions were then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXXI

In 100 parts of deionized water was dissolved 0.20 part Type A gelatin. In another 100 parts of deionized water were dissolved 0.18 part gum arabic and 0.02 part sodium carboxylmethylcellulose (CMC). The pH of each colloidal solution was adjusted to between 9 and 10 by the addition of a small amount of dilute sodium hydroxide. The gelatin and gum arabic CMC solutions were then combined with 150 parts of water containing 0.09 part Dupanol EM. In 100 parts vinyl monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXXII

In 100 parts of deionized water was dissolved 0.15 part Type A gelatin and 0.15 part of gum arabic. The pH of each colloidal solution was adjusted to between 9 and 10 by the addition of a small amount of dilute sodium hydroxide. The colloidal solutions were then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXXIII

In 100 parts of deionized water was dissolved 0.10 part Type A gelatin and 0.20 part of gum arabic. The pH of each colloidal solution was adjusted to between 9 and 10 by the addition of a small amount of dilute sodium hydroxide. The colloidal solutions were then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding dilute hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXXIV

In 200 parts of deionized water was dissolved 0.20 part Type A gelatin and 0.20 part of gum arabic. The pH of the colloidal solution was adjusted to between 9 and 10 by the addition of a small amount of dilute sodium hydroxide. The colloidal solution was then combined with 150 parts of water containing 0.09 part Dupanol EM. In 100 parts vinyl acetate monomer were dissolved 0.50 part of benzoyl peroxide. To disperse the catalyst-containing monomer in the colloidal mixture, the monomer was added slowly to the mixture with continuous agitation. The pH of the mixture was then adjusted to about 5 by adding hydrochloric acid while stirring, thereby forming the gelatin-gum arabic coacervate and producing a stable dispersion of the monomer. Polymerization was initiated by raising the temperature of the reaction medium to 160–180° F. (71–82° C.). This temperature was maintained with agitation for 3 hours to complete polymerization. Fine, uniform, spherical particles were produced, with no formation of agglomerates. The product was drained through a sieve, washed with warm water, and air-dried.

Example XXXV

About 250 pounds of deaerated and deionized water were added to a glass-lined jacketed reactor. In 13.75 pounds of deionized water each were dissolved 0.14 pound of Type A gelatin and 0.14 pound of gum arabic. The pH of each colloidal solution was adjusted to between 9 and 10. The colloidal solutions were then combined and added to the reactor. 0.28 pound of lauroyl peroxide was then added to the reaction and the entire mixture in the reactor was agitation. A vacuum of about 27 inches of mercury was pulled on the reactor and 138.7 pounds of purified vinyl chloride were introduced into the reactor. The pH of the mixture was then adjusted to about 5 by adding dilute hydrochloric acid while stirring, thereby forming the gelatin coacervate and producing a stable dispersion of the monomer. polymerization was initiated by raising the temperature of the reaction medium to 140–150° F. This temperature was maintained until the reaction was completed. The system at this point was under pressure and the pressure remained constant until about 80 percent of the monomer was polymerized. At this point there was a distinct drop of pressure. When this occurred, the reactor was cooled by running cold water through the jacket. Fine, uniform, spherical particles were produced with no formation of agglomerates. The product was drained through a sieve, washed with warm water, and air-dried.

EXAMPLE XXXVI

About 250 pounds of deaerated and deionized water were added to a glass-lined jacketed reactor. In 13.75 pounds of deionized water each was dissolved 0.07 pound of Type A gelatin and 0.07 pound of gum arabic. The pH of each colloidal solution was adjusted to between 9 and 10. The colloidal solutions were then combined and added to the reactor. 0.28 pound of lauroyl peroxide was then added to the reactor and the entire mixture in the reactor was agitated. A vacuum of about 27 inches of mercury was pulled on the reactor and 138.7 pounds of purified vinyl chloride were introduced into the reactor. The pH of the mixture was then adjusted to about 5 by adding dilute hydrochloric acid while stirring, thereby forming the gelatin coacervate and producing a stable dispersion of the monomer. Polymerization was initiated by raising the temperature of the reaction medium to 140–150° F. This temperature was maintained until the reaction was completed. The system at this point was under pressure and the pressure remained constant until about 80 percent of the monomer was polymerized. At this point there was a distinct drop of pressure. When this occurred, the reactor was cooled by running cold water through the jacket. Fine, uniform, spherical particles were produced with no formation of agglomerates. The product was drained through a sieve, washed with warm water, and air-dried.

Example XXXVII

In 100 parts of deionized and deaerated water were dissolved 0.20 part Type A gelatin and 0.20 part of gum karaya. The pH of each colloidal solution was adjusted to between 9 and 10 by the addition of a small amount of dilute sodium hydroxide. The colloidal solutions were combined and added to the reactor. 0.2 part of lauroyl peroxide was then added to the reactor and the entire mixture was agitated. A vacuum of about 27 inches of mercury was pulled on the reactor and 100 parts of purified vinyl chloride were introduced into the reactor. The pH of the mixture was then adjusted to about 5 by adding dilute hydrochloric acid while stirring, thereby forming the gelatin coacervate and producing a stable dispersion of the monomer. Polymerization was initiated by raising the temperature of the reaction medium to 140–150° F. This temperature was maintained until the reaction was completed. The system at this point was under pressure and the pressure remained constant until about 80 percent of the monomer was polymerized. At this point there was a distinct drop of pressure. When this occurred, the reactor was cooled by running cold water through the jacket. Fine, uniform, spherical particles were produced with no formation of agglomerates. The product was drained through a sieve, washed with warm water, and air-dried.

Example XXXVIII

In 200 parts of deionized and deaerated water were dissolved 0.10 part Type A gelatin and 0.10 part gum tragacanth. The pH of the colloidal solution was adjusted to between 9 and 10 by the addition of a small amount of dilute sodium hydroxide. The colloidal solution was added to the reactor. 0.2 part of lauroyl peroxide was then added to the reactor and the entire mixture was agitated. A vacuum of about 27 inches of mercury was pulled on the reactor and 100 parts of purified vinyl chloride were introduced into the reactor. The pH of the mixture was then adjusted to about 5 by adding dilute hydrochloric acid while stirring, thereby forming the gelatin coacervate and producing a stable dispersion of the monomer. Polymerization was initiated by raising the temperature of the reaction medium to 140–150° F. This temperature was maintained until the reaction was completed. The system at this point was under pressure and the pressure remained constant until about 80 percent of the monomer was polymerized. At this point there was a distinct drop of pressure. When this occurred, the reactor was cooled by running cold water through the jacket. Fine, uniform, spherical particles were produced with no formation of agglomerates. The product was drained through a sieve, washed with warm water, and air-dried.

Example XXXIX

In 200 parts of deionized and deaerated water was dissolved 0.10 part Type A gelatin and 0.10 part agar agar. The pH of the colloidal solution was adjusted to between 9 and 10 by the addition of a small amount of dilute sodium hydroxide. The colloidal solution was added to the reactor. 0.2 part of lauroyl peroxide was then added to the reactor and the entire mixture was agitated. A vacuum of about 27 inches of mercury was pulled on the reactor and 100 parts of purified vinyl chloride were introduced into the reactor. The pH of the mixture was then adjusted to about 5 by adding dilute hydrochloric acid while stirring, thereby forming the gelatin coacervate and producing a stable dispersion of the monomer. Polymerization was initiated by raising the temperature of the reaction medium to 140–150° F. This temperature was maintained until the reaction was completed. The system at this point was under pressure and the pressure remained constant until 80 percent of the monomer was polymerized. At this point, there was a distinct drop of pressure. When this occurred, the reactor was cooled by running cold water through the jacket. Fine, uniform, spherical particles were produced with no formation of agglomerates. The product was drained through a sieve, washed with warm water, and air-dried.

I claim:
1. In a process for the dispersion polymerization of vinyl chloride, methyl methacrylate, ethyl acrylate or styrene in an aqueous medium in the presence of a polymerization initiator and a stabilizing agent to form polymers thereof, the improvement which comprises conducting the polymerization in the presence of a coacervate of gelatin and at least one more negatively-charged, water-soluble colloid as the stabilizing agent to obtain polymer particles of uniform size.

2. The process of claim 1 in which the gelatin is Type A gelatin and the more negatively-charged colloid is Type B gelatin or a gum.

3. A process for dispersion polymerization of vinyl chloride, methyl methacrylate, ethyl acrylate or styrene in the presence of a polymerization initiator and a coacervate stabilizing agent of gelatin and at least one more negatively-charged, water-soluble colloid to obtain polymer particles of uniform size comprising the steps of:
   (a) preparing an aqueous solution containing one colloid of the group consisting of gelatin and a more negatively-charged colloid;
   (b) dispersing the monomer in the aqueous solution;
   (c) adding to the aqueous solution the counterpart colloid capable of coacervating with the initially added colloid;
   (d) forming the coacervate in the aqueous solution; and
   (e) initiating the polymerization of the monomer in the presence of the coacervate.

4. The process of claim 3 wherein the gelatin is Type A gelatin and the more negatively-charged colloid is Type B gelatin or a gum.

5. A process for the dispersion polymerization of vinyl chloride, methyl methacrylate, ethyl acrylate or styrene in the presence of a polymerization initiator and a coacervate stabilizing agent of gelatin and at least one more negatively-charged, water-soluble colloid to obtain polymer particles of uniform size comprising the steps of:
   (a) preparing an aqueous solution containing gelatin and at least one more negatively-charged colloid;
   (b) forming the coacervate in the aqueous solution;
   (c) dispersing the monomer in the aqueous solution; and
   (d) initiating the polymerization of the monomer in the presence of the coacervate.

6. The process of claim 5 wherein the gelatin is Type A gelatin and the more negatively-charged colloid is Type B gelatin or a gum.

7. A process for the dispersion polymerization of vinyl chloride, methyl methacrylate, ethyl acrylate or styrene in the presence of a polymerization initiator and a coacervate stabilizing agent of gelatin and at least one negatively-charged, water-soluble colloid to obtain polymer particles of uniform size comprising the steps of:
   (a) preparing an aqueous solution containing gelatin and the more negatively-charged colloid;
   (b) dispersing the monomer in the aqueous solution;
   (c) forming the coacervate in the aqueous solution; and
   (d) initiating the polymerization of the monomer in the presence of the coacervate.

8. The process of claim 7 wherein the gelatin is Type A gelatin and the more negatively-charged colloid is Type B gelatin or a gum.

9. The process for the dispersion polymerization of vinyl chloride, methyl methacrylate, ethyl acrylate or styrene in the presence of a polymerization initiator and a coacervate stabilizing agent of gelatin and at least one more negatively-charged colloid to obtain polymer particles of uniform size comprising the steps of:
   (a) dispersing the monomer in an aqueous solution;
   (b) adding gelatin and the more negatively-charged colloid to the aqueous solution;
   (c) forming the coacervate in the aqueous solution; and
   (d) initiating the polymerization of the monomer in the presence of the coacervate.

10. The process of claim 9 wherein the gelatin is Type A gelatin and the more negatively-charged colloid is Type B gelatin or a gum.

References Cited

Presentation given at Soc. Plast. Eng. Annual Tech. Conf. (28th), May 4, 1970, Church et al.

HOWARD E. SCHAIN, Primary Examiner

U.S. Cl. X.R.

210—117

PO-1050
(5/69)

UNITED STATES PATENT OFFICE
CERTIFICATE OF CORRECTION

Patent No. 3,784,491      Dated January 8, 1974

Inventor(s) Roman L. Pozorski

It is certified that error appears in the above-identified patent and that said Letters Patent are hereby corrected as shown below:

Column 2, line 7 "surface-active) agent)" should read --surface-active agent)--.

Column 10, line 32 "prouced without" should read --produced without--.

Column 12, line 61 "gelatiin-gum" should read --gelatin-gum--.

Column 14, line 73 "adding hydrochlorie" should read --adding dilute hydrochloric--.

Column 15, line 24 "polymerization" should read --Polymerization--.

Column 18, line 2 "one negatively-charged," should read --one more negatively-charged,--.

Column 18, line 36 References cited in H. Schain's 3/28/72 Form PO-892 omitted.
2,833,754    5/58     Richards et al.     260     8X
Chem. Abstracts, Vol. 74, 1971, 4140W Signed and sealed this 17th day of September 1974.

(SEAL)
Attest:

McCOY M. GIBSON JR.
Attesting Officer

C. MARSHALL DANN
Commissioner of Patents